United States Patent [19]
Rubin et al.

[11] Patent Number: 5,809,140
[45] Date of Patent: Sep. 15, 1998

[54] SESSION KEY DISTRIBUTION USING SMART CARDS

[75] Inventors: Aviel D. Rubin, East Hanover; Victor J. Shoup, Hoboken, both of N.J.

[73] Assignee: Bell Communications Research, Inc., Morristown, N.J.

[21] Appl. No.: 729,917

[22] Filed: Oct. 15, 1996

[51] Int. Cl.$^6$ .................................................. H04L 9/00
[52] U.S. Cl. .............................. 380/21; 380/25; 380/44; 380/49
[58] Field of Search ................................ 380/25, 21, 44, 380/49

[56] References Cited

U.S. PATENT DOCUMENTS

| | | | |
|---|---|---|---|
| 5,455,953 | 10/1995 | Russell | 395/739 |
| 5,604,807 | 2/1997 | Yamaguchi et al. | 380/48 |
| 5,627,892 | 5/1997 | Kauffman | 380/21 |

OTHER PUBLICATIONS

O. Goldreich, S. Goldwasser, and S. Micali, "How to Construct Random Functions," Journal of the ACM, vol. 33, pp. 210–217, 1986.

T. Leighton and S. Micali, "Secret–Key Agreement without Public–Key Crpytography," Advances in Cryptology–Crypto '93, pp. 456–479, 1993.

R. Needham and M. Schroeder, "Using Encryption for Authentication in Large Networks of Computers," Communications of the ACM, vol. 21, pp. 993–999, 1978.

M. Bellare, P. Rogaway, "Provably Secure Session Key Distribution—The Three Party Case," 27th Annual ACM Symposium on Theory of Computing, pp. 57–66, 1995.

*Primary Examiner*—Thomas H. Tarcza
*Assistant Examiner*—Carmen D. White
*Attorney, Agent, or Firm*—Joseph Giordano; Loria B. Yeadon; David A. Hey

[57] ABSTRACT

Methods and apparatus are disclosed for providing secure session key distribution using a smart circuit card or other intelligent device. First and second hosts communicate with each other and with a server over a communication network. The first host initiates the session key distribution process by transmitting a session identifier to the server. The first host uses a first smart card storing the first host secret key to generate a first message in the form of a random bit stream which is transmitted to the second host. The server generates a second message as a function of the server secret key and the session identifier, and transmits it to the first host. The second host uses a second smart card storing the second host secret key to generate a third message as a function of the second host secret key and the first message, and transmits the third message to the first host. The first host then uses the first smart card to generate a potential session key pair as a function of the second and third messages and the first host secret key. If the first host accepts the session key pair, it transmits one of the session keys of the pair to the second host. The second host uses the second smart card to generate a validity indication as a function of the transmitted session key and a portion of the third message, and accepts or rejects the session key depending upon the result. The first and second cards may be implemented as stateless devices which include only limited memory, processing and input/output capabilities.

26 Claims, 4 Drawing Sheets

SESSION KEY DISTRIBUTION USING SMART CARDS

FIELD OF THE INVENTION

The present invention relates generally to secure session key distribution techniques, and more particularly to the use of smart circuit cards or other intelligent devices to facilitate secure session key distribution.

BACKGROUND OF THE INVENTION

Conventional session key distribution protocols are described in R. Needham and M. Schroeder, "Using Encryption for Authentication in Large Networks of Computers," Communications of the ACM, Vol. 21, pp. 993–999, 1978, and T. Leighton and S. Micali, "Secret-key agreement without public-key cryptography," Advances in Cryptology-Crypto '93, pp. 456–479, 1993, both of which are incorporated by reference herein. FIG. 1 shows an exemplary system 10 in which a session key distribution protocol may be implemented. The system 10 includes a communication network 15 which serves as a transmission medium linking a number of hosts 20-i, i=1, 2, . . . n, to each other and to a server S. The server S stores a secret key K and each host i stores a secret key $K_i$. These long-term secret keys are utilized to establish session keys. The distribution protocol typically involves processes executing on one or more of the hosts 20-i attempting to establish session keys with processes executing on other hosts 20-i. These processes communicate with each other and with the server S in order to establish the session keys.

For purposes of security analysis, it may be assumed that an adversary has substantially complete control over the communication network 15. The adversary can therefore deliver messages out of order, delete or modify messages, create new messages and initiate new processes on a given host. It may also be assumed that the adversary can obtain session keys that have already been established, and can corrupt a given host and thereby obtain its long-term secret key $K_i$. Faced with such a powerful adversary, the goal of a session key distribution protocol is generally to prevent the adversary from obtaining any information about session keys that it clearly should not have. These and other aspects of session key distribution security are described in greater detail in M. Bellare and P. Rogaway, "Provably Secure Session Key Distribution-The Three Party Case," 27th Annual ACM Symposium on Theory of Computing, pp. 57–66, 1995, which is incorporated by reference herein. The Bellare-Rogaway reference discloses a session key distribution protocol and proves that it is secure against the above-described adversary. The Bellare-Rogaway proof of security assumes the existence of pseudo-random function (PRFs) such as those described in greater detail in O. Goldreich, S. Goldwasser, and S. Micali, "How to Construct Random Functions," Journal of the ACM, Vol. 33, pp. 210–217, 1986, which is incorporated by reference herein.

The exemplary session key distribution protocol of the Bellare-Rogaway reference will now be described in greater detail. At system initialization, a security parameter k is specified, along with some number n of hosts. The security parameter k refers to a polynomial bound for an algorithm used to model the actions of an adversary. For simplicity, it will be assumed that the hosts are named 1, . . . , n as shown in FIG. 1, although the model can be extended to cover a situation in which host names are chosen dynamically by an adversary. A series of random bits are generated, and long-term secret keys K, $K_1$, . . . , $K_n$ are generated from the random bits. The secret key K is stored in the server S and each $K_i$ is stored in the corresponding host 20-i. For each pair i,j of hosts, and each u≧1, there is a process II(i;j, u) which is attached to host i and is attempting to establish a session key with a process on host j. The index u specifies a particular one of a possible multitude of processes on host i attempting to establish session keys with processes on host j.

The security model provided in the Bellare-Rogaway reference assumes that the adversary may be represented by a polynomial-time, probabilistic algorithm. In an exemplary attack, the adversary chooses a number of hosts n, bounded by a polynomial in k, and runs a system initialization routine. The adversary then interacts with the server S and the processes running on the n hosts. This interaction generally takes the form of a sequence of time-ordered question/answer pairs: the adversary asks a question addressed to a given process, a given host, or the server and gets an answer. The time-ordered sequence of question/answer pairs is referred to as the adversary's "transcript" and the transcript together with any sets of random numbers generated by the adversary are referred to as its "view".

One exemplary type of question/answer pair corresponds to the delivery of a message to either a process or the server, and a corresponding response. It should be noted that a given process typically carries state information, so that the answer to one question may depend on previous questions sent to that process. As the interaction proceeds, the process may output a special message referred to as an "acceptance" which implies that this process has established a session key with another process operating on another host. It is generally assumed without limitation in the Bellare-Rogaway security model that the server does not carry state information, although the security analysis can be extended in a straightforward manner to accommodate state dependence in the server. There are generally at least two other types of questions the adversary can ask in accordance with the Bellare-Rogaway security model. First, the adversary can request that a given process II(i;j,u) that has already accepted reveal its session key. The response will result in process II(i;j,u) being "opened". Second, the adversary can request a host 20-i to reveal its secret key $K_i$. The response will result in the host 20-i being "opened".

The Bellare-Rogaway session key distribution protocol specifies the manner in which the server S and any given process will answer a sequence of questions. The protocol generally also specifies a partner function, which either maps a given process II(i;j,u) to a process II(j;i,v) which can be computed efficiently from the adversary's transcript, or indicates that the given process has no partner. A process II(i;j,u) is said to hold a "fresh" session key if all of the following conditions hold: it has accepted; it is unopened; its partner process, if any, is unopened; and hosts i and j are unopened. The freshness of a given session key can generally be determined from the adversary's transcript. At the end of an interaction with a particular process, the adversary either stops, or selects another process holding a fresh session key. In the former case, the adversary scores a 0; in the latter case, the adversary is given a random string and the session key of the other process, in a random order, and attempts to decide which is which; the adversary scores a 1 if correct and a −1 if incorrect. The "advantage" of the adversary is defined as the absolute value of the expected value of the adversary's score, over a complete set of interactions. The Bellare-Rogaway model considers a session key distribution protocol to be secure if the following conditions hold: (1) for any adversary, and for any pair of processes II(i;j,u) and II(j;i,v), if the adversary faithfully transmits messages between the two processes and the server, the two processes accept and share the same session key; and (2) for every adversary, its advantage is negligible as a function of the security parameter k.

An important remaining source of insecurity in these and other conventional session key distribution protocols relates to the storage of the long-term secret keys $K_i$ on the hosts 20-i. If an adversary can corrupt a host and obtain its secret key, then all past and future messages encrypted using session keys established by processes on that host can be decrypted by the adversary. This problem is particularly serious in view of the likely presence of both known and unknown security holes in host and/or server operating systems and other software.

This secret key storage security problem is addressed in certain conventional systems by storing the long-term secret keys on a "smart card" accessible by the host instead of on the host itself. The smart card may be implemented as a secure, tamper-resistant circuit card or other intelligent device which includes a memory, a relatively limited processing capability and input/output interface circuitry. The secret key is typically stored within the smart card memory, and all accesses to the secret key pass through the smart card. Unfortunately, conventional session key distribution protocols are generally not designed to take full advantage of the enhanced security offered by use of a smart card.

As is apparent from the foregoing, a need exists for an improved session key distribution protocol which can more fully utilize the enhanced security potential of a smart card and thereby overcome the above-noted problems of the prior art.

SUMMARY OF THE INVENTION

The present invention provides session key distribution protocols which are designed to take full advantage of the security advantages provided by smart cards and thereby overcome the problems of the prior art. It should be noted that the protocols of the present invention may be implemented with or without smart cards, and in either case will provide improved processing performance relative to conventional protocols.

An exemplary protocol in accordance with the invention may be implemented in a computer network in which first and second hosts communicate with each other and with a server. The first host initiates the session key distribution process by transmitting a session identifier to the server. The first host uses a first smart card storing the first host secret key to generate a first message in the form of a random bit stream which is transmitted to the second host. The server generates a second message as a function of the server secret key and the session identifier, and transmits it to the first host. The second host uses a second smart card storing the second host secret key to generate a third message as a function of the second host secret key and the first message, and transmits the third message to the first host. The first host then uses the first smart card to generate a potential session key pair as a function of the second and third messages and the first host secret key. If the first host accepts the session key pair, it transmits one of the session keys of the pair to the second host. The second host uses the second smart card to generate a validity indication as a function of the transmitted session key and a portion of the third message, and accepts or rejects the session key depending upon the result. The first and second cards may be implemented as stateless devices which include only limited memory, processing and input/output capabilities.

In accordance with one aspect of the invention, a method is provided for establishing a secure session key between first and second hosts which communicate over a network. The method includes the steps of transmitting a session identifier from at least one of the first and the second hosts to a server connected to the network; transmitting a first message from the first host to the second host, wherein the first message is a random bit string generated in the first host; receiving in the first host a second message from the server, wherein the second message is generated in the server as a function of a server secret key and the session identifier received from at least one of the first and second hosts; receiving in the first host a third message from the second host, wherein the third message is generated in the second host as a function of a second host secret key and the first message received from the first host; and generating a potential session key pair in the first host as a function of the second and third messages and a first host secret key.

The method may include the additional steps of accepting the session key pair in the first host if the first host determines that the potential session key pair corresponds to a valid session key pair, and rejecting the session key pair in the first host otherwise; transmitting one of the session keys of the potential session key pair to the second host if the session key pair is accepted in the first host; generating in the second host as a function of the transmitted session key and at least a portion of the third message an indication of the validity of the transmitted session key; and accepting or rejecting the transmitted session key in the second host depending upon the value of the validity indication.

In accordance with another aspect of the invention, an apparatus is provided which includes a processor associated with the first host. The processor is operative to transmit a session identifier to a server connected to the network, to transmit a first message to the second host, wherein the first message is a random bit string generated in the first host, to receive a second message from the server, wherein the second message is generated in the server as a function of a server secret key and the session identifier, and to receive a third message from the second host, wherein the third message is generated in the second host as a function of a second host secret key and the first message received from the first host. The apparatus also includes a smart card connected to communicate with the processor. The smart card includes a memory for storing the first host secret key, inputs for receiving the first and second messages, and an output corresponding to a potential session key pair.

The session key distribution protocols of the present invention provide a number of advantages over prior art protocols. As noted above, the protocols of the present invention more fully exploit the security potential of smart cards. In addition, the protocols generally require fewer parallel rounds of message flows relative to the above-described prior art Bellare-Rogaway protocol. Furthermore, the server in the protocol of the present invention need only be contacted the first time a process on the first host initiates the protocol with a process on the second host. The values generated by the server in this initial contact can then be stored in an insecure cache memory in the first host without altering the overall security of the protocol. If this host cache memory includes the values required by a given process when that process executes the protocol, the protocol will utilize even fewer message flows. The distribution protocols of the present invention also provide significantly enhanced security relative to non-smart card session key distribution.

Even if an adversary is able to obtain temporary direct access to a smart card, session keys generated at any other past or future time are not compromised. This security advantage is provided while placing only minimal demands on the memory, processing and input/output resources of the smart card, and without any significant constraints on when session keys are generated or how many session keys are generated.

These and other advantages and features of the present invention will become more apparent from the accompanying drawings and the following detailed description.

DETAILED DESCRIPTION OF THE PREFERRED EMBODIMENTS

The present invention will be illustrated below in conjunction with exemplary session key distribution protocols. It should be understood, however, that the invention is not limited to any particular technique or group of techniques, but is instead more generally applicable to any secure key exchange application. It should also be noted that although the invention is particularly well-suited for use in computer network applications, it may also provide significant advantages in any of a number of other secure communication applications. The term "smart card" should be understood to include not only devices commonly known as smart cards but more generally any type of device which includes a memory for storing a secret key, at least some limited processing capability, and an ability to interface with a host. The terms "host" and "server" should be understood to include any type of computer or other digital data processor which operates in accordance with a session key distribution protocol.

Figure 1:
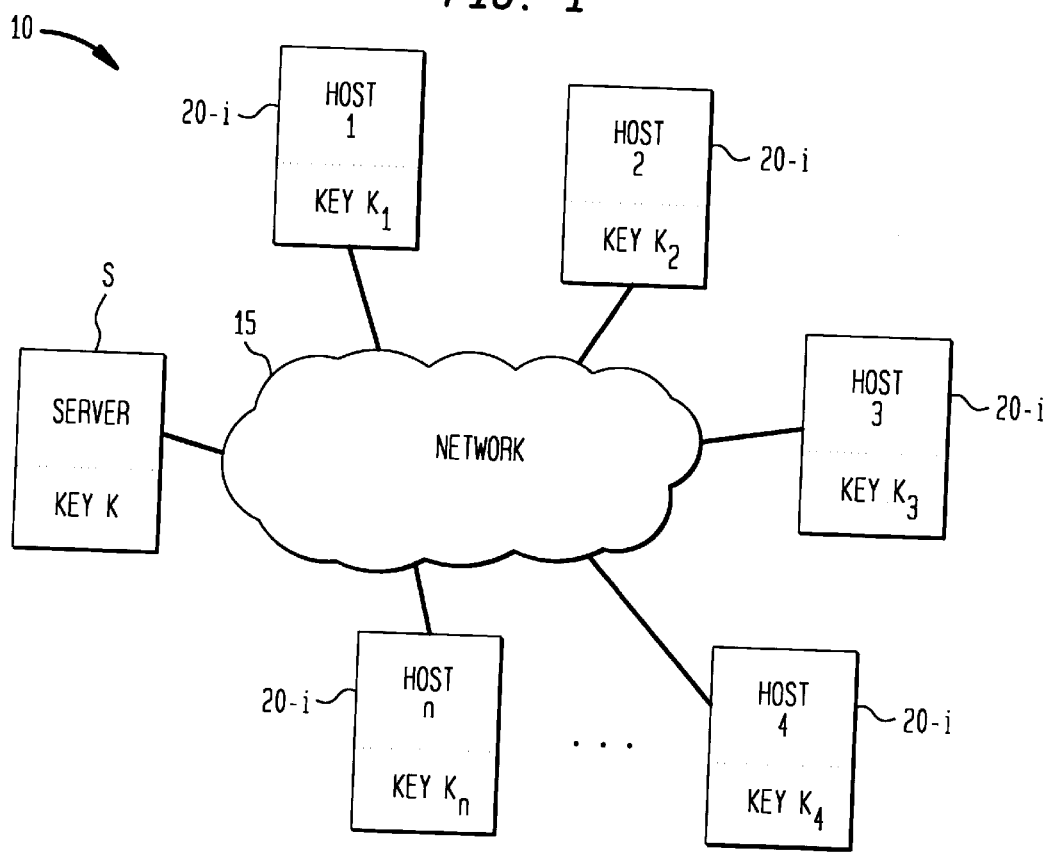
FIG. 1 shows an exemplary computer network in which the session key distribution protocols of the present invention may be implemented.
Figure 2:
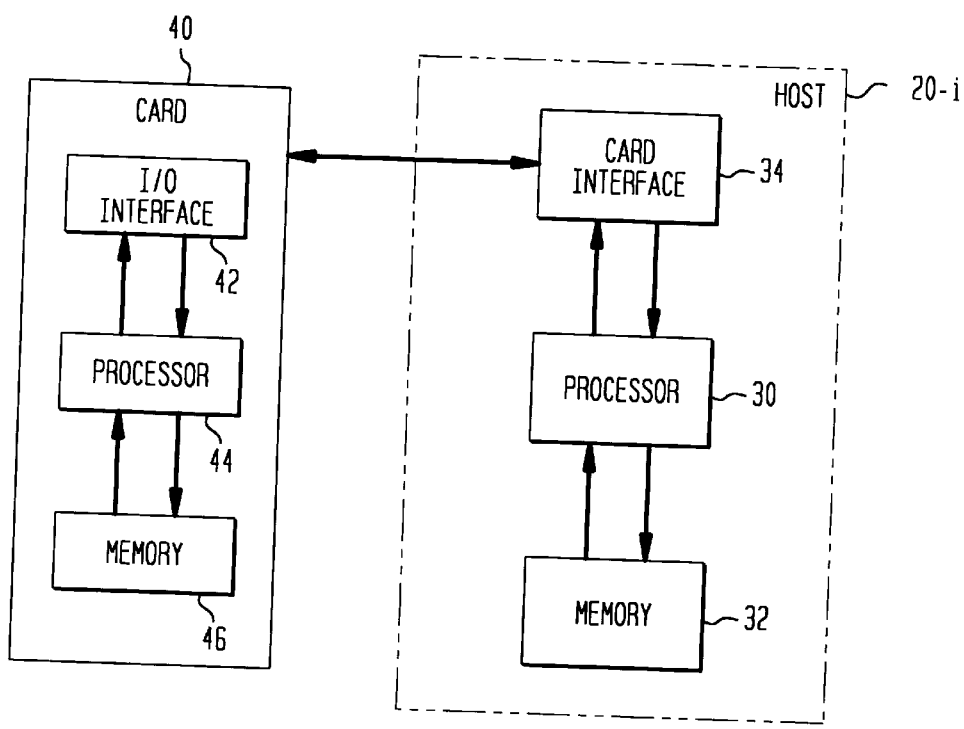
FIG. 2 is a block diagram of an embodiment of the invention in which a host processor utilizes information stored on an external "smart card" to establish a session key.

FIG. 2 shows an exemplary host 20-i and smart card 40 suitable for use in a session key distribution protocol in accordance with the invention. The host 20-i in this embodiment is a computer which includes a processor 30, a memory 32 and a card interface 34. The smart card 40 includes an input/output interface 42, a processor 44 and a memory 46. The host 20-i communicates with the smart card 40 via the card interface 34 and the input/output interface 42. The processor 44 may be a microprocessor configured to provide cryptographic processing operations as described in greater detail below. The memory 46 of card 40 may be an electronic static or dynamic random access memory (RAM), a magnetic memory or other suitable arrangement of information storage elements. The card interface 34 and input/output interface 42 may be in conformance with a standard card interface such as the personal computer memory card interface adapter (PCMCIA) standard. Alternatively, the card 40 may be a card of the type referred to as CryptaPlus™ and available from Telequip Corp. of Hollis, N.H., or of the type referred to as iPower™ and available from National Semiconductor Corp. of Santa Clara, Calif. Other smart cards suitable for use with the present invention include cards available from Datakey Inc. of Burnsville, Minn. and Gemplus Card International Corp. of Gaithersburg, Md.

In an exemplary embodiment of the invention, the card 40 is used to generate session keys which are subsequently stored in the memory 32 of the host 20-i. A process operating on host 20-i then performs encryption or other cryptographic functions using the stored session keys. This allows the card 40 to be implemented as a device with relatively limited computational power and low input/output bandwidth. The card 40 in this example will be assumed without limitation to operate as a stateless device, such that the current output depends only on the current input and not on any prior inputs. For a given input x, the card 40 will thus output a function with a value determined by the input x, the secret key $K_i$ stored in memory 46, and a random or pseudo-random bit sequence generated in card 40 or supplied to card 40 via host 20-i. This assumption recognizes that many currently available smart cards include limited memory, processing and input/output capabilities. For example, a typical smart card chip, the Motorola MC68HC05SC24, includes 3 Kbytes of read-only memory, 1 Kbyte of non-volatile memory and 128 bytes of random-access memory, a processor driven by an externally-provided clock of 5 MHz or less, and an input/output rate of 9600 bits/second. Despite the limited capabilities of the smart card, the present invention can allow a large number of processes operating on a given host to simultaneously execute the session key distribution protocol without interfering with each other in accessing the card 40. An exemplary function which may be computed in card 40 will be described below in conjunction with FIG. 4.

As in the above-described Bellare-Rogaway security model, it may be assumed herein that an adversary has complete control over the communications network, and can obtain the session key from a particular process upon demand. More generally, it may be assumed that the adversary can obtain from the process all of the information the process receives through its interaction with the smart card. The session key distribution protocol of the present invention may be configured such that under normal circumstances, only a process on a given host will be able to directly access the smart card corresponding to that host. An adversary may occasionally be able to directly access the smart card, using techniques such as a network break-in or virus, the replacement of the host software by rogue software, and physically stealing or borrowing the smart card. During the time in which an adversary has access to the smart card of a given host, the adversary can mimic a process on that host to gain knowledge regarding the generation of a session key. However, it should be noted that the adversary does not thereby gain knowledge of the session keys generated at any other past or future time. If an adversary physically steals the card, then with some effort and expense, the adversary may be able to break the hardware security defenses of the card, and obtain the stored secret key of the corresponding host. Although this is an important possibility, it should also be recognized that the session keys unrelated to the corrupted host will remain secure.

The present invention provides session key distribution protocols which are demonstrably secure in accordance with the above-described security assumptions of the Bellare-Rogaway model. In an illustrative embodiment, the server may be treated essentially as a smart card, because the server generally requires only limited memory and computational ability. Both the server and the actual host smart cards need only compute a relatively small number of pseudo-random type functions, which may be efficiently implemented using conventional techniques including block-ciphers such as digital encryption standard (DES) or hash functions such as MD5. These and other pseudo-random function generating techniques are well-known in the art and will therefore not be further described herein. The invention will be illustrated below using two exemplary protocols, the first implemented in an embodiment without smart cards and the second implemented in an embodiment with smart cards.

Figure 3:
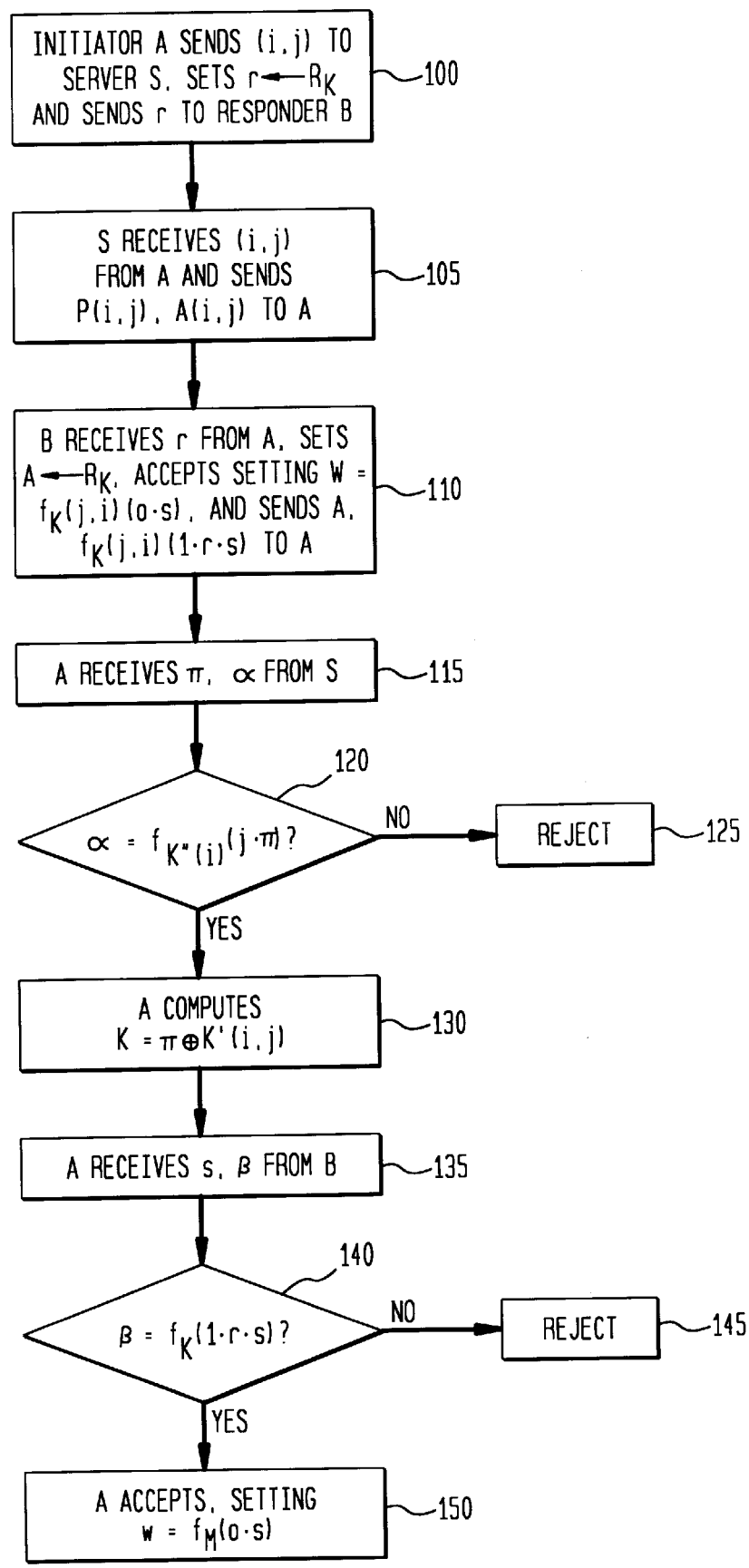
FIG. 3 is a flow diagram of an exemplary session key distribution protocol in accordance with one embodiment of the invention.

FIG. 3 is a flow chart illustrating an exemplary embodiment of a session key distribution protocol in accordance with the invention. As noted above, this protocol is implemented in this example without the use of smart cards. The protocol of FIG. 3 assumes that a pseudo-random function (PRF) generator $f$ is available that for a security parameter k takes a k-bit secret key, produces a k-bit output, and allows inputs of up to 2k+1 bits. For a given key K and input x, the value of the PRF is written as $f_K(x)$. The protocol is implemented in a communication network which includes a server S and n hosts. During a system initialization, three random keys K, K' and K" of length k are chosen as the secret keys of the server S. The secret key stored in a given host i consists of the triple (K(i), K'(i), K"(i)). The notation K(i) will refer to $f_K(i)$ and K(i,j) will refer to $f_{K(i)}(j)$ for values of $1 \leq i$ and $j \leq n$. Similar notations will be used for K' and K". The notation P(i,j) or simply $\pi$ will be used to refer to K(j,i)⊕K'(i,j) and the notation A(i,j) or simply $\alpha$ will refer to $f_{K''(i)}(j \cdot P(i,j))$. The notation $r \leftarrow R_k$ will denote assignment of a random k-bit string to message variable r.

The protocol for a process A on host i to establish a session key with process B on host j is shown in the steps of FIG. 3. A given FIG. 3 step number will be shown below in parenthesis following the description of that step. It is assumed in this example that process A initiates the protocol, so A is referred to as the initiator and B is referred to as the responder. After a process accepts, it assigns the agreed-upon session key to the variable $\omega$. As shown in FIG. 3, the protocol begins with initiator A sending the host pair identifiers (i,j) to the server S, setting the message $r \leftarrow R_k$ and sending message r to the responder B (step 100). The server S receives (i,j) from A, uses its stored secret keys to compute P(i,j) and A(i,j), and sends P(i,j) and A(i,j) to the initiator A (step 105). The responder B receives message r from A, sets a message $s \leftarrow R_k$, accepts by setting $\omega = f_{K(j,i)}(0 \cdot s)$, and sends the message s and a message $\beta = f_{K(j,i)}(1 \cdot r \cdot s)$ to A (step 110). The initiator A then receives $\pi$ and $\alpha$ from server S (step 115), rejects if $\alpha \neq f_{K''(i)}(j \cdot \pi)$ (steps 120 and 125), and otherwise computes $\kappa = \pi \oplus K'(i,j)$ (step 130). A then receives the messages s and $\beta$ from B (step 135), rejects if $\beta \neq f_\kappa(1 \cdot r \cdot s)$ (steps 140 and 145), and otherwise accepts by setting $\omega = f_\kappa(0 \cdot s)$ (step 150). This exemplary protocol is demonstrably secure using the above-noted assumptions of the Bellare-Rogaway security model. A suitable security proof may be based on the additional assumption that the function $f$ is a secure PRF generator.

The session key distribution protocol of the present invention also includes a specified partner function. An initiator II(i;j, u) has as its partner II(j;i,v) if II(i;j,u) received the messages s, $\beta$ in step 135 of FIG. 3, and P(j;i,v) is the unique responder of the form P(j,i,·) that sent the messages s, $\beta$' in step 110, otherwise II(i;j,u) has no partner. A responder P(j;i,v) has as its partner II(i;j,u) if P(j;i,v) received the message r in step 110 and II(i;j,u) is the unique initiator of the form II(i;j,·) that sent the message r in step 100.

The above-described protocol has a number of advantages over the previously described prior art Bellare-Rogaway protocol. First, although the total number of message flows in both protocols is four, the protocol of the present invention requires only two parallel rounds of message flows, while the Bellare-Rogaway protocol requires three parallel rounds. Second, the server in the protocol of the present invention need only be contacted the first time a process on host i initiates the protocol with a process on host j. The P(i,j) and A(i,j) values can be stored in an insecure cache memory in host i, and this cache memory may be viewed as being maintained by the adversary without altering the above-noted security assumptions. If this host cache memory includes the values of P(i,j) and A(i,j) required by process A, the protocol will generally utilize only two message flows and one parallel round of flows.

An exemplary protocol using smart cards in accordance with the invention will now be described in greater detail. The security assumptions of this protocol will be similar to those described above for the protocol of FIG. 3, with a number of differences to be noted below. The secret keys will be stored in the memory 46 of a given smart card 40, and the smart cards will be used in a substantially stateless fashion to compute session keys which are then stored in the memory 32 of a process on the corresponding host 20-i. The system initialization is performed as in the protocol of FIG. 3, except that the secret keys are stored in the smart cards rather than the hosts. The adversary may obtain question/answer pairs in a manner similar to that previously described, but with the following modifications. First, it will be assumed that the adversary may "open" any process at any time, even if the process has not yet accepted a session key. Upon receiving an "open" request, the process reveals a complete description of the conversation it has carried out with the smart card of its host, as well as the outcomes of any random number generation if the process is probabilistic. This type of attack is at least as powerful as reading the private memory of a process, which is normally protected by host operating system defenses, including its session key, or obtaining the session key via cryptanalysis or other means. Second, the adversary may open a host's smart card at any time. When this happens, the adversary is given the secret keys stored on the corresponding smart card. In practice, this type of attack will generally be difficult to mount, as it entails physically obtaining the smart card and breaking the card's physical security defenses. Third, the adversary may access a host's smart card at any time. That is, the adversary may ask any question of the smart card that conforms to the smart card's functional input/output interface 42, and receive the corresponding answer. This type of attack subsumes several other types of attacks, including a network break-in or virus, replacement of the host's software by rogue software, or physically stealing the card. The transcript, view, and partner functions are as described previously, except as altered to conform with the above-noted modifications to the question/answer pairs.

A process II(i;j,u) is considered to hold a "fresh" session key if the following conditions hold: the process has accepted; it is unopened; its partner, if any, is unopened; the smart cards on hosts i and j are unopened; and j's smart card has not been accessed between the times of II(i;j,u)'s first and last questions. Again, it should be note that freshness can be determined from the adversary's transcript. The protocol is considered secure if the above-noted conditions (1) and (2) of the Bellare-Rogaway security model are met.

Figure 4:
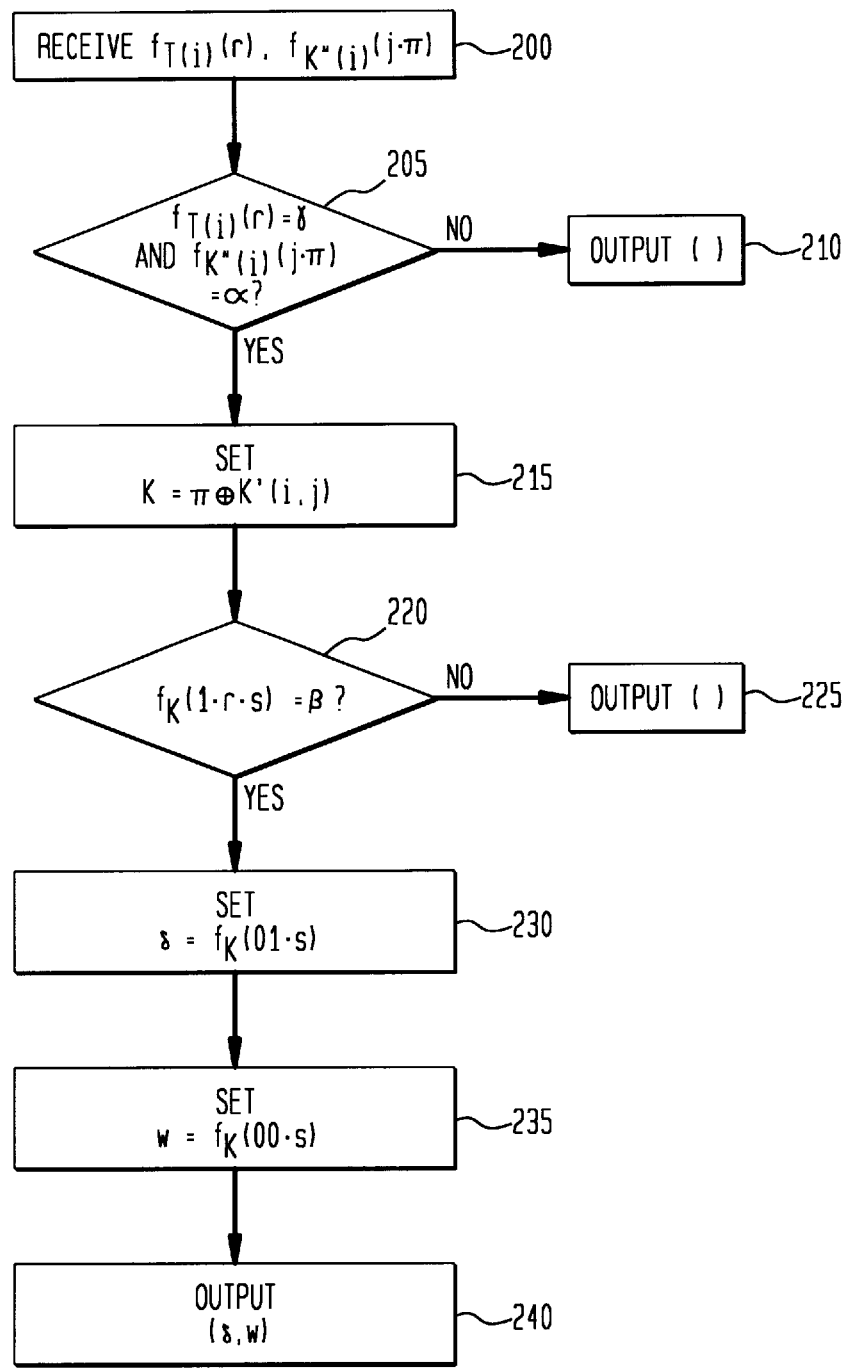
FIGS. 4 and 5 are flow diagrams illustrating different portions of an exemplary session key distribution protocol in accordance with another embodiment of the invention.
Figure 5:
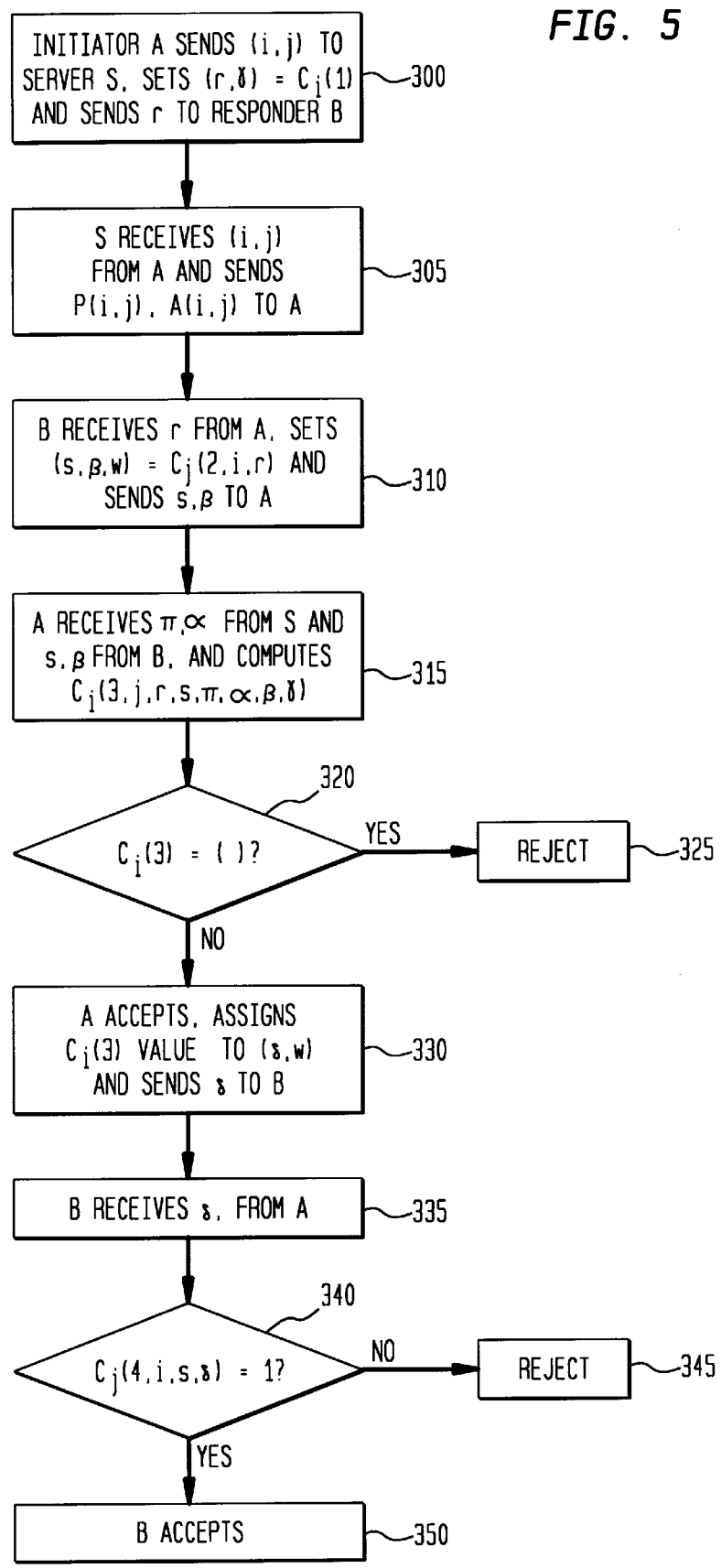

FIGS. 4 and 5 illustrate an exemplary smart card based protocol in accordance with the invention. Secret keys are generated in the manner described above for the protocol of FIG. 3, except that the secret keys are now stored in the smart cards. Also, the smart card of host i is given a random k-bit string T(i). The notation described above in conjunction with the protocol of FIG. 3 is also adopted in this example. The smart card based protocol to be described may be viewed as three separate portions: a server interface portion, a smart card interface portion, and a process-to-process portion. The server interface portion is the same as the server interface described above in conjunction with FIG. 3. The smart card interface portion supports four types of queries that can be made of all smart cards. The notation $C_i(\cdot)$ will be used to denote a query to i's smart card. For clarity, host i will be used to illustrate certain queries while host j is used to illustrate others. The four types of queries are defined as follows:

$$C_i(1) = (r, f_{T(i)}(r)), \text{ where } r \leftarrow R_k;$$

$$C_j(2,i,r) = (s, \beta, c), \text{ where } s \leftarrow R_k, \beta = f_{K(j,i)}(1 \cdot r \cdot s), \text{ and } \omega = f_{K(j,i)}(00 \cdot s);$$

$$C_i(3,j,r,s,\pi,\alpha,\beta,\gamma) = (\ ) \text{ or } (\delta, \omega);$$

and $$C_j(4,i,s,\delta) = 1 \text{ if } ff_{K(j,i)}(01 \cdot s) = \delta, \text{ and } 0 \text{ otherwise.}$$

FIG. 4 illustrates the computation of the third inquiry $C_i(3,j,r,s,\pi,\alpha,\beta,\gamma)$ noted above. The FIG. 4 step number is shown in parenthesis after the description of that step. The values $f_{T(i)}(r)$ and $f_{K''(i)}(j \cdot \pi)$ are received in the smart card associated with host i from host j (step 200). If $f_{T(i)}(r) = \gamma$ and $f_{K''(i)}(j \cdot \pi) = \alpha$ (step 205), the smart card sets $\kappa = \pi \oplus K'(i,j)$ (step 215), and otherwise outputs the empty set ( ) (step 210). The smart card then determines whether or not $f_\kappa(1 \cdot r \cdot s) = \beta$ (step 220) and if not outputs the empty set ( ) (step 225). If $f_\kappa(1 \cdot r \cdot s) = \beta$, the smart card sets $\delta = f_{78}(01 \cdot s)$ (step 230), sets $\omega = f_\kappa(00 \cdot s)$ (step 235) and outputs $(\delta, \omega)$ (step 240). These functional operations are performed within a processor 44 of a smart card 40 associated with host i.

FIG. 5 illustrates the process-to-process portion of the exemplary smart card based protocol. It is assumed in this example that process A is an initiator on host i, and process B is a responder on host j. Upon acceptance, the A process assigns the session key to the variable ω. Again, step numbers from FIG. 5 are shown in parenthesis after the corresponding description. The protocol begins with initiator A sending the host pair identifiers (i,j) to the server S, setting (r,γ)=$C_i$(1), and sending message r to responder B (step 300). The server S receives (i,j) from A, uses its stored secret keys to compute P(i,j) and A(i,j), and sends P(i,j) and A(i,j) to A (step 305). The responder B receives r from A, sets $(s,\beta,\omega) = C_j(2,i,r)$ as computed by the smart card associated with B, and sends the messages s and β to A (step 310). A then receives π and α from S and the messages s and β from B, and the smart card associated with A computes $C_i(3,j,r,s,\pi,\alpha,\beta,\gamma)$ in the manner previously described in conjunction with FIG. 4 (step 315). If the computed value is determined to be the empty set ( ), A rejects (step 325). Otherwise A accepts, assigns the computed value to $(\delta,\omega)$, and sends δ to B (step 330). B receives δ from A (step 325), accepts if the inquiry $C_j(4,i,s,\delta) = 1$ as computed in the smart card associated with B (steps 340, 350), and rejects otherwise (step 345). The partner function for this exemplary protocol may be defined in the same manner as that described above for the protocol of FIG. 3. Again, this exemplary protocol is demonstrably secure using the above-noted assumptions of the Bellare-Rogaway security model, and a suitable security proof may be based on the additional assumption that the function $f$ is a secure PRF generator.

It should be noted that the random strings r and s may be implemented using conventional counters, without adversely affecting security. Although this implies that the corresponding processes are not entirely stateless, some amount of state dependence will typically be needed to generate pseudo-random numbers.

Although illustrated above using a single stateless server S, the present invention is also particularly well-suited for use with multiple servers corresponding to multiple replications of the above-described stateless server S. The protocols of FIGS. 3, 4 and 5 may be directly applied to such multiple servers in order to provide a higher availability of service.

The above-described embodiments of the invention are intended to be illustrative only. Numerous alternative embodiments may be devised by those skilled in the art without departing from the scope of the following claims.

What is claimed is:

1. A method of establishing a secure session key between first and second hosts which communicate over a network, the method comprising the steps of:

transmitting a session identifier from at least one of the first and the second hosts to a server connected to the network;

transmitting a first message from the first host to the second host, wherein the first message is a random bit string generated in the first host;

receiving in the first host a second message from the server, wherein the second message is generated in the server as a function of a server secret key and the session identifier received from at least one of the first and second hosts;

receiving in the first host a third message from the second host, wherein the third message is generated in the second host as a function of a second host secret key and the first message received from the first host; and generating a potential session key pair in the first host as a function of the second and third messages and a first host secret key.

2. The method of claim 1 wherein the step of generating the potential session key pair further includes the step of applying the second and third messages as inputs to a first card which is associated with the first host and stores the secret key for the first host.

3. The method of claim 2 wherein the card is implemented as a stateless processing device such that the potential session key pair depends only on the second and third messages and no previously received messages.

4. The method of claim 2 wherein the card further includes a memory for storing the first host secret key and a processor for generating the potential session key pair in response to the second and third messages.

5. The method of claim 1 further including the steps of:

accepting the session key pair in the first host if the first host determines that the potential session key pair corresponds to a valid session key pair, and rejecting the session key pair in the first host otherwise; and transmitting one of the session keys of the potential session key pair to the second host if the session key pair is accepted in the first host.

6. The method of claim 5 further including the steps of:

receiving in the second host a transmitted session key of a session key pair accepted in the first host;

generating in the second host as a function of the transmitted session key and at least a portion of the third message an indication of the validity of the transmitted session key; and accepting or rejecting the transmitted session key in the second host depending upon the value of the validity indication.

7. The method of claim 1 further including the step of generating the first message in a first card which is associated with the first host and stores the first host secret key, the first card providing an output corresponding to the first message.

8. The method of claim 1 further including the step of generating the third message in a second card which is associated with the second host and stores the second host secret key, the second card receiving the first message as an input and providing the third message as an output.

9. The method of claim 1 further including the step of generating the potential session key pair in a first card which is associated with the first host and stores the first host secret key, the first card receiving the second and third messages as an input and providing the potential session key pair as an output.

10. The method of claim 6 wherein the step of generating in the second host an indication of the validity of the transmitted session key further includes the step of generating the indication in a second card associated with the second host, the second card receiving the transmitted session key and at least a portion of the third message as inputs and providing an output corresponding to the validity indication.

11. An apparatus for use in establishing a secure session key between first and second hosts which communicate over a network, the apparatus comprising:

a processor associated with the first host, the processor operative to transmit a session identifier to a server connected to the network, to transmit a first message to the second host, wherein the first message is a random bit string generated in the first host, to receive a second message from the server, wherein the second message is generated in the server as a function of a server secret key and the session identifier, and to receive a third message from the second host, wherein the third message is generated in the second host as a function of a second host secret key and the first message received from the first host; and a card connected to communicate with the processor, the card including a memory for storing the first host secret key, inputs for receiving the first and second messages, and an output corresponding to a potential session key pair.

12. The apparatus of claim 11 wherein the card is implemented as a stateless processing device such that the potential session key pair depends only on the second and third messages and no previously received messages.

13. The apparatus of claim 11 wherein the card further includes a card processor for generating the potential session key pair as a function of the second and third messages.

14. The apparatus of claim 11 wherein the processor is further operative to accept the session key pair if the potential session key pair is determined to correspond to a valid session key pair, to reject the session key pair otherwise, and to transmit one of the session keys of the potential session key pair to the second host if the session key pair is accepted.

15. A method of establishing a secure session key between first and second hosts which communicate over a network, the method comprising the steps of:

transmitting a session identifier from at least one of the first and the second hosts to a server connected to the network;

receiving in the second host a first message from the first host, wherein the first message is a random bit string generated in the first host, and further wherein the first host receives from the server a second message generated in the server as a function of a server secret key and the session identifier;

transmitting from the second host to the first host a third message from the second host, wherein the third message is generated in the second host as a function of a second host secret key and the first message received from the first host; and receiving in the second host a session key generated in the first host as a function of the second and third messages and a first host secret key, wherein the session key has been accepted in the first host.

16. The method of claim 15 further including the step of generating the third message in a second card which is associated with the second host and stores the second host secret key, the second card receiving the first message as an input and providing the third message as an output.

17. The method of claim 16 wherein the card is implemented as a stateless processing device such that the potential session key pair depends only on the second and third messages and no previously received messages.

18. The method of claim 16 wherein the card further includes a memory for storing the first host secret key and a processor for generating the potential session key pair in response to the second and third messages.

19. The method of claim 15 further including the steps of:

accepting the session key pair in the first host if the first host determines that the potential session key pair corresponds to a valid session key pair, and rejecting the session key pair in the first host otherwise; and transmitting one of the session keys of the potential session key pair to the second host if the session key pair is accepted in the first host.

20. The method of claim 15 further including the steps of:

generating in the second host as a function of the transmitted session key and at least a portion of the third message an indication of the validity of the transmitted session key; and accepting or rejecting the transmitted session key in the second host depending upon the value of the validity indication.

21. The method of claim 20 wherein the step of generating in the second host an indication of the validity of the transmitted session key further includes the step of generating the indication in a second card associated with the second host, the second card receiving the transmitted session key and at least a portion of the third message as inputs and providing an output corresponding to the validity indication.

22. An apparatus for use in establishing a secure session key between first and second hosts which communicate over a network, the apparatus comprising:

a processor associated with the second host, the processor operative to transmit a session identifier to a server connected to the network, to receive a first message from the first host, wherein the first message is a random bit string generated in the first host, and further wherein the first host receives from the server a second message generated in the server as a function of a server secret key and the session identifier, to transmit to the first host a third message, wherein the third message is generated in the second host as a function of a second host secret key and the first message received from the first host, and to receive a session key generated in the first host as a function of the second and third messages and a first host secret key, wherein the session key has been accepted in the first host; and a card connected to communicate with the processor, the card including a memory for storing the second host secret key, inputs for receiving the first message, and an output corresponding to the third message.

23. The apparatus of claim 22 wherein the card is implemented as a stateless processing device such that the potential session key pair depends only on the first message and no previously received messages.

24. The apparatus of claim 23 wherein the card further includes a memory for storing the second host secret key and a card processor for generating the third message.

25. The apparatus of claim 22 wherein the processor is further operative to accept or reject the transmitted session key depending upon the value of a validity indication, wherein the validity indication is generated as a function of the session key and at least a portion of the third message.

26. The apparatus of claim 25 wherein the card includes inputs for receiving the transmitted session key and at least a portion of the third message and an output corresponding to the validity indication.

* * * * *